Feb. 28, 1967 R. B. WALLACE 3,306,330
FRICTION LOCK SCREW
Filed April 18, 1966

INVENTOR.
RICHARD B. WALLACE
BY Whittemore,
Hulbert & Belknap
ATTORNEYS

United States Patent Office 3,306,330
Patented Feb. 28, 1967

3,306,330
FRICTION LOCK SCREW
Richard B. Wallace, Bloomfield Hills, Mich., assignor to The Oakland Corporation, Troy, Mich., a corporation of Michigan
Filed Apr. 18, 1966, Ser. No. 543,402
2 Claims. (Cl. 151—7)

This is a continuation-in-part of application Serial No. 289,287, filed June 20, 1963, now Patent No. 3,259,928.

The present invention relates to a friction lock screw characterized in the provision of a friction locking element extending longitudinally of the screw and received in a recess therein.

It is an object of the present invention to provide a screw of the type described in the preceding paragraph in which the elongated friction element, preferably formed of a plastic material such as nylon, is firmly retained against displacement or dislodgement.

More specifically, it is an object of the present invention to provide a screw of the type described having an elongated slot extending from the threaded end thereof longitudinally of the screw and terminating in a shoulder against which one end of the friction element abuts.

It is a feature of the present invention to provide a friction lock screw as described in the preceding paragraph in which the shoulder at the inner end of the slot is slightly undercut so as to retain the inner end of the friction element firmly in the slot against dislodgement.

It is a further feature of the present invention to provide a friction lock screw as described in the foregoing in which the side walls of the longitudinally extending slot converge from the bottom of the slot so as to retain the friction element firmly in the slot.

Other objects and features of the invention will become apparent as the description proceeds, especially when taken in conjunction with the accompanying drawing, illustrating preferred embodiments of the invention, wherein.

The present invention relates to the production of a friction locking screw in which an element formed of a good friction material, such for example as nylon, is embedded in a recessed portion of the screw in position to engage and interfere with the threads of a tapped opening into which the screw is threaded. In order to increase frictional resistance to rotation of the screw the friction element is elongated in the direction of the axis of the screw and for this purpose an elongated groove or slot is provided which extends axially of the screw from its threaded end to a point spaced substantially from the threaded end of the screw.

Figure 1:
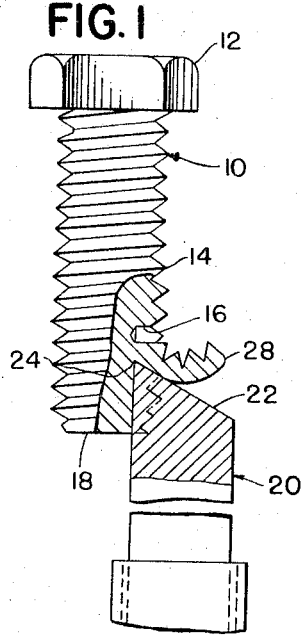
FIGURE 1 is a schematic elevational view, partly in section, showing one manner of producing the friction lock screw.
Figure 2:
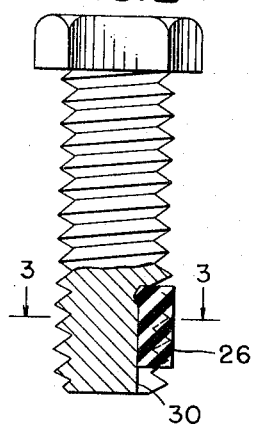
FIGURE 2 is an elevational view, partly in section, showing the friction lock element positioned in the slot of the screw.
Figure 3:
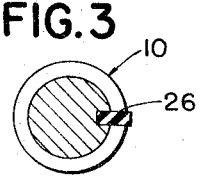
FIGURE 3 is a sectional view on the line 3—3, FIGURE 2.

Referring first to FIGURES 1–3 there is illustrated a screw or bolt 10 having a head 12 and a threaded shank 14. In order to provide the screw 10 with a friction element, a small cylindrical opening 16 is drilled radially into one side of the screw at a distance from the threaded end 18 thereof determined by the desired length of the friction element. Thereafter, while the screw 10 is firmly supported by suitable means, a cutting blade 20 having an inclined face 22 and terminating in a sharp cutting edge 24 is moved axially of the screw from a position engaging the threaded end 18 thereof to a position in which the pointed end of the blade 20 intersects the drilled recess 16. The width of the blade 20 is substantially equal to the width of the friction element 26 which is to be placed therein although it may be slightly narrower, requiring some distortion of the friction element as it is inserted.

From FIGURE 1 it will be observed that the blade 20 is initially positioned so that it cuts the slot to the required final depth in a single cut. The depth of cut is somewhat below the roots of the thread on the screw so that a single chip, indicated at 28, is removed.

After the threaded end of the screw has been slotted the friction element 26, which may be a flat strip of nylon plastic, is inserted into the slot 30. The insertion of the friction material is preferably carried out with substantial pressure so as to completely fill both the slot 30 and the inner end of the drilled opening 16, as is clearly illustrated in FIGURE 2. This insures that the friction element will remain firmly in the slot and will not be displaced when the screw is engaged with a nut or is threaded into a tapped opening in a body. It will be observed from the figures that the outer edge of the strip 26 of friction material extends above the crests of the thread in the illustrated embodiment of the invention. It is of course not necessary for the strip to extend so high and it is sufficient if it extends up into the thread space sufficiently to provide an adequate friction lock with the crests of the threads of the female part.

It will further be observed that the inner end of the strip 26 engages a shoulder formed at the inner end of the slot 30 extending below the roots of the thread convolutions. This is important since the part into which the screw 10 is threaded initially engages the outer end of the friction strip and tends to displace it longitudinally toward the head 12 of the screw. By forming a shoulder at the inner end of the slot, displacement of the friction lock material is definitely prevented.

In addition to preventing longitudinal displacement of the friction element, it is proposed to modify the screw so as to improve its resistance to dislodgement of the friction element out of the slot. This embodiment of the invention is illustrated in FIGURES 4–7.

Figure 5:
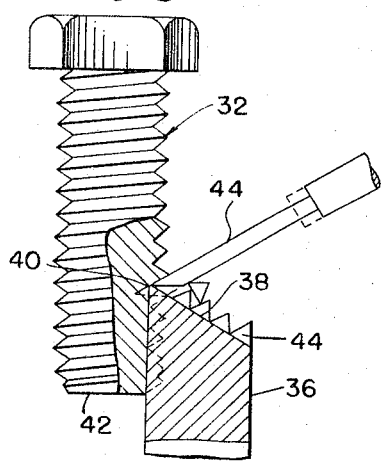
FIGURE 5 is a schematic elevational view illustrating one step in the production of a different embodiment of the present invention.

Referring first to FIGURE 5, the screw designated at 32 is provided with a slot 34 in two steps. As illustrated in FIGURE 5, the blade 36 having an inclined front surface 38 terminating in a sharp cutting edge 40, is engaged with the threaded end 42 of the screw at a point about tangent to the roots of the threads. The blade 36 is moved relative to the screw 32 to form a slot which in this operation extends only to the roots of the threads so that in effect it severs separate independent thread portions 44 as chips.

In this operation, instead of providing a drilled hole or opening 16, a small chisel-like cutting tool or blade 44 is provided. The blade 44 is inserted longitudinally into the side of the screw 32 to the dotted line position illustrated in FIGURE 5 so as to form an opening into which the cutting edge 40 of the blade 36 will advance so as to insure separation of the chips.

Figure 6:
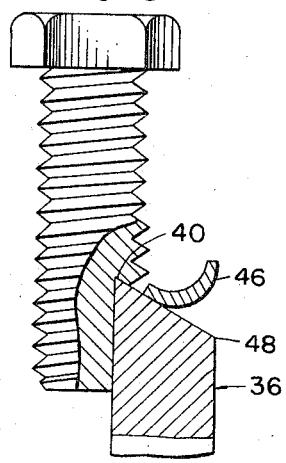
FIGURE 6 is a view similar to FIGURE 5 illustrating the second step in the production of the friction screw.
Figure 7:
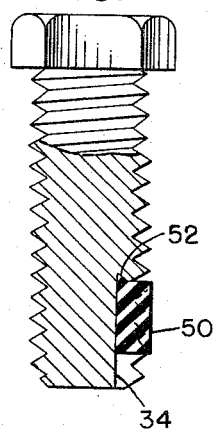
FIGURE 7 is an elevational view, partly in section, showing the friction locking element in position in the slot in the screw.

After the blade 36 has advanced to the position shown in FIGURE 5 it is retracted and adjusted to the position shown in FIGURE 6. In this position the blade 36 is adapted to deepen its previous cut and to form a slot 34 as illustrated in FIGURE 7. Since the first cut was substantially tangent to the roots of the threads, the second cut will remove a single chip 46 and this chip will be free from the screw when the blade 36 reaches the position shown in FIGURE 6 or slightly before reaching such position, due to the fact that the blade 44 had previously been inserted to the full depth position shown in dotted lines in FIGURE 5, and thereafter withdrawn. The blade 36 or at least the blade which performs the second cut illustrated in FIGURE 6, is characterized in that its flat side walls are slightly tapered, converging from the sharp cutting edge 40 toward the edge intersecting the surface 38 at the obtuse angle 48. The amount of such taper or inclination of the side walls may be only one or two degrees although a greater taper is possible due to the method of production illustrated in FIGURES 5 and 6.

It will be observed that the individual threads each produce a separate chip 44 so that the displacement of these chips from the slot is not difficult. The single chip 46 produced, as illustrated in FIGURE 6, is a relatively thin chip and although it may initially have a width slightly greater than the width of the slot adjacent its radially outer edge, the chip is readily distorted and bent so that no difficulty is encountered in displacement of the chip from the slot as it is formed.

Figure 4:
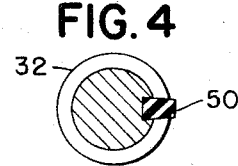
FIGURE 4 is a sectional view similar to FIGURE 3 showing a somewhat different embodiment of the invention.

FIGURE 4 illustrates the friction lock element 50 as having a radially outward taper so that it is firmly interlocked throughout its length in the slot 34.

A second important feature of the friction lock screw shown in FIGURE 7 is that its inner end is firmly interlocked to prevent radial outward displacement thereof. This is the result of continuing advance of the blade 36, as illustrated in FIGURE 6, until its cutting edge 40 has undercut the end wall as clearly illustrated in FIGURES 6 and 7. Accordingly, when the plastic friction element 50 is forcibly inserted into the slot 34, under relatively great pressure, the plastic material is caused to flow so that its inner end is permanently deformed in confirmation of the undercut indicated at 52. It may be mentioned at this time that it is desirable to insert the plastic friction element under relatively great pressure so that it will retain the deformation accompanying its insertion and overcome its tendency to return to its shape before deformation in a phenomenon referred to as plastic memory. Again, the friction stip 50 may initially be of a width somewhat greater than the maximum width of the slot 34 so that as it is inserted, preferably longitudinally from the open end of the slot but alternately in a radial direction, the material of the strip is deformed so that it remains in firm friction contact with the walls of the slot. Accordingly, the strip 50 as seen in FIGURE 7, is retained by a combination of frictional engagement with the slot, a mechanical interlock resulting from the radially inward divergence of the side walls of the slot, and further by a separate mechanical interlock resulting from deformation of the inner end of the plastic element permanently into the undercut 52 provided at the inner end of the slot.

It will be observed both in FIGURE 2 and in FIGURE 7 that the outer end of the friction element 26 or 50 is spaced inwardly from the end of the screw by a distance of more than a single thread convolution. With this arrangement it is possible to insure starting the screw in the thread opening without interference with the friction locking element. Once the screw has been started, engagement between the end of the friction element and the bolt or other member having a threaded opening, does not interfere with continued screw action.

The drawing and the foregoing specification constitute a description of the improved friction lock screw in such full, clear, concise and exact terms as to enable any person skilled in the art to practice the invention, the scope of which is indicated by the appended claims.

What I claim as my invention is:

1. A friction locking screw having a threaded portion provided with an elongated slot extending from a threaded end of the screw longitudinally thereof for a distance at least several times its width and terminating at its inner end in an abrupt undercut shoulder located below the roots of the thread convolutions, an elongated friction locking element formed of a deformable plastic material such as nylon positioned in said slot with its inner end permanently pressure deformed to conform to and underlie the undercut shoulder, said element completely filling the cross-sectional area of said slot and extending radially outwardly therefrom beyond the roots of the threads on said threaded portion, said element being shorter than said slot by an amount sufficient to space the outer end of said element inwardly of the threaded end of said screw by a distance greater than the axial dimension of a single thread convolution, to facilitate starting a nut on said screw without interference from said plastic element.

2. A screw as defined in claim 1 in which the side walls of said slot converge radially outwardly, and in which the plastic element is permanently pressure deformed to fill said slot from side to side and to thereby be interlocked with the converging side walls of the slot.

References Cited by the Examiner
UNITED STATES PATENTS

| | | | |
|---|---|---|---|
| 2,409,638 | 10/1946 | Lyon | 151—7 |
| 3,149,654 | 9/1964 | Podell | 151—7 |
| 3,150,702 | 9/1964 | Buckley et al. | 151—7 |
| 3,176,744 | 4/1965 | Brightman | 151—7 |
| 3,203,041 | 8/1965 | Beuter et al. | 151—7 |

FOREIGN PATENTS

| | | |
|---|---|---|
| 504,853 | 5/1939 | Great Britain. |

CARL W. TOMLIN, *Primary Examiner.*

R. S. BRITTS, *Assistant Examiner.*